US012658214B2

(12) United States Patent
Okada

(10) Patent No.: US 12,658,214 B2
(45) Date of Patent: Jun. 16, 2026

(54) METHOD OF MANUFACTURING MAGNETIC DISK DEVICE AND MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Mio Okada, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/769,046

(22) Filed: Jul. 10, 2024

(65) Prior Publication Data

US 2025/0232795 A1    Jul. 17, 2025

(30) Foreign Application Priority Data

Jan. 16, 2024    (JP) ................................. 2024-004508

(51) Int. Cl.
*G11B 33/04*        (2006.01)
*G11B 5/48*         (2006.01)

(52) U.S. Cl.
CPC ........ *G11B 33/0433* (2013.01); *G11B 5/4833* (2013.01); *G11B 2220/2516* (2013.01)

(58) Field of Classification Search
None
See application file for complete search history.

(56) References Cited

U.S. PATENT DOCUMENTS

| | | | | | |
|---|---|---|---|---|---|
| 5,303,104 | A | * | 4/1994 | Aruga ................. | G11B 5/5521 360/267.5 |
| 5,987,735 | A | * | 11/1999 | Horning .............. | G11B 25/043 279/2.03 |
| 6,066,218 | A | * | 5/2000 | Kuhn ..................... | B29C 65/48 156/87 |
| 6,381,092 | B1 | * | 4/2002 | Suzuki ................. | G11B 17/038 |
| 6,424,501 | B1 | * | 7/2002 | Tsujino ................... | G11B 5/54 |
| 7,267,841 | B2 | | 9/2007 | Kim et al. | |
| 11,094,347 | B1 | * | 8/2021 | Herdendorf ............ | G11B 21/24 |
| 11,574,653 | B2 | | 2/2023 | Uehara et al. | |
| 2004/0218495 | A1 | * | 11/2004 | Fechner ............... | G11B 7/0956 369/53.19 |
| 2007/0201332 | A1 | * | 8/2007 | Kuroda .............. | G11B 7/08511 369/53.14 |
| 2007/0297301 | A1 | * | 12/2007 | Verschuren .......... | G11B 7/0956 369/44.32 |

(Continued)

FOREIGN PATENT DOCUMENTS

| | | | |
|---|---|---|---|
| JP | 4167634 | B2 | 10/2008 |
| JP | 2022-190510 | A | 12/2022 |

*Primary Examiner* — Peter Vincent Agustin
(74) *Attorney, Agent, or Firm* — Kim & Stewart LLP

(57) ABSTRACT

A method of manufacturing a magnetic disk device of an embodiment includes: adjusting relative heights of a spindle and a plurality of ramps, the spindle being allowed to rotate in a state in which center axes of a plurality of magnetic disks having ends deviating from a geometrical plane with a center point as a reference are aligned, the plurality of ramps being arranged at end positions of the plurality of magnetic disks; and assembling the plurality of magnetic disks along an axial direction of the spindle in a state in which directions of deviations of the ends from the center point are aligned.

10 Claims, 12 Drawing Sheets

(56)          References Cited

U.S. PATENT DOCUMENTS

| | | | |
|---|---|---|---|
| 2012/0063026 A1* | 3/2012 | -Yang Juang | G11B 33/025 |
| | | | 360/75 |
| 2012/0075750 A1* | 3/2012 | Chan | G11B 21/22 |
| | | | 360/294 |
| 2023/0110894 A1* | 4/2023 | Suzuki | G11B 5/012 |
| | | | 360/135 |
| 2025/0201273 A1* | 6/2025 | McNab | G11B 17/021 |

* cited by examiner

FIG.1

FIG.5A
CS1: 0 TO 10 um
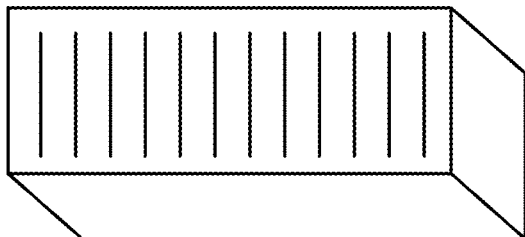
FIG.5B
CS2: 11 TO 20 um
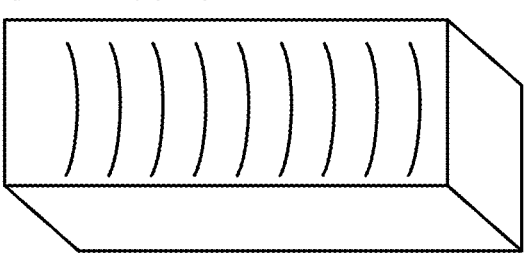
FIG.5C
CS3: 21 TO 30 um
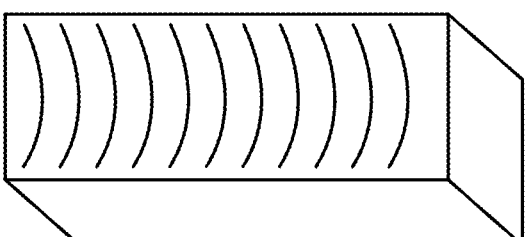
FIG.5D
CS4: 31 TO 40 um
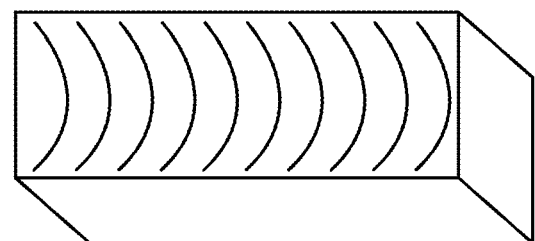
FIG.6
| DISK FLATNESS | SHIM THICKNESS |
|---|---|
| CS1: 0 TO 10 um | SH1: 0.10 mm |
| CS2: 11 TO 20 um | SH2: 0.11 mm |
| CS3: 21 TO 30 um | SH3: 0.12 mm |
| CS4: 31 TO 40 um | SH4: 0.13 mm |

FIG.7A
FIG.7B
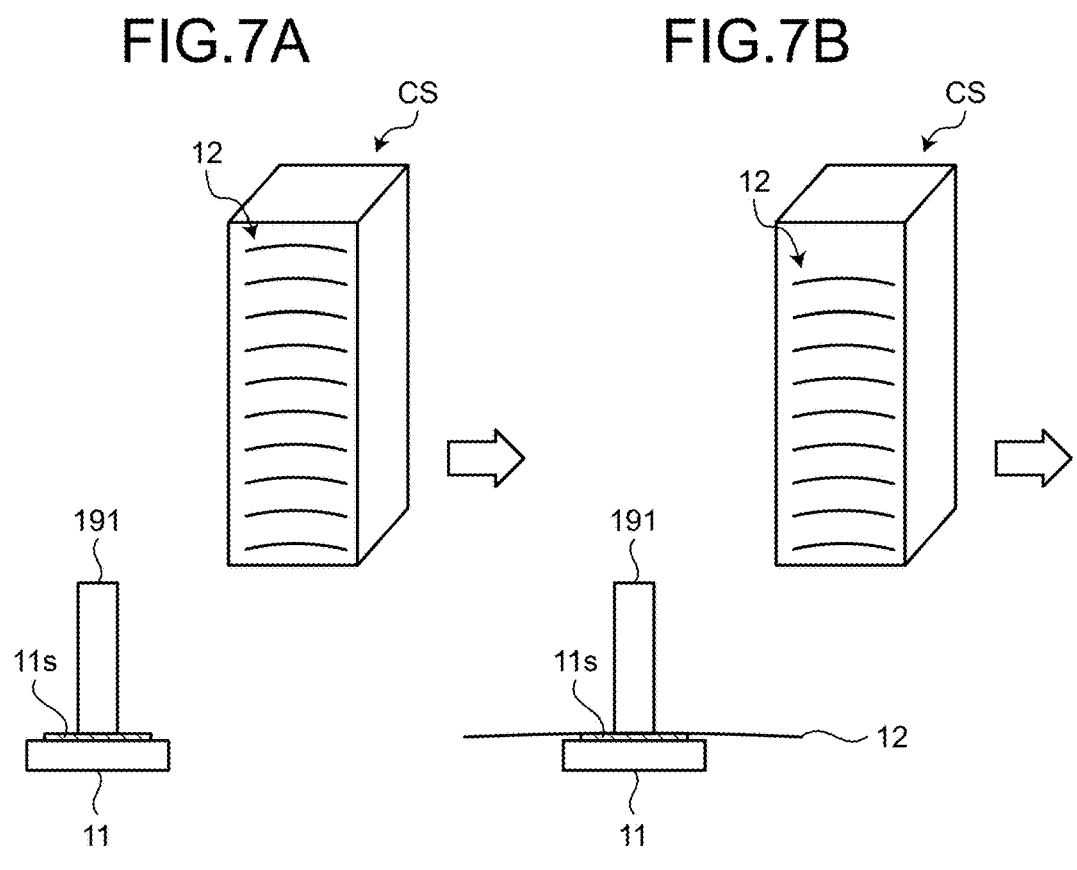
FIG.7C
FIG.7D
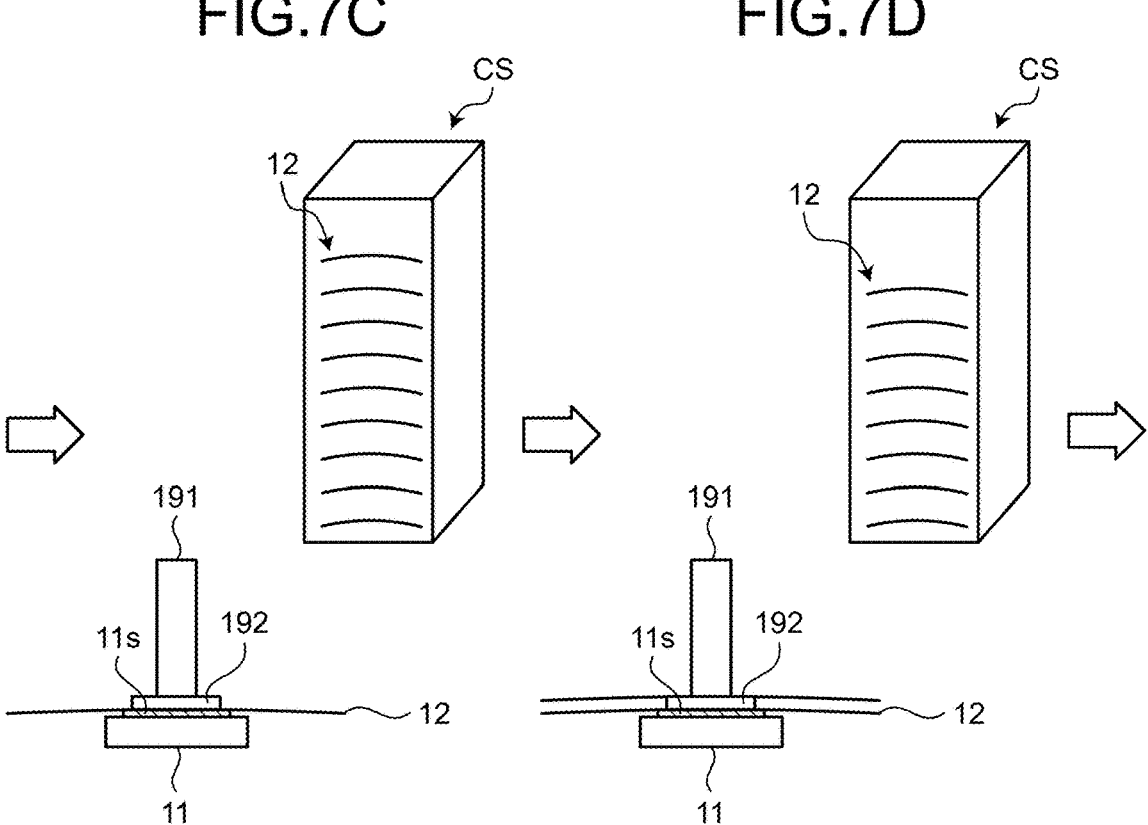

FIG.11

| DISK FLATNESS | SHIM THICKNESS |
|---|---|
| CS1: 0 TO 10 um | SH11: 0.13 mm |
| CS2: 11 TO 20 um | SH12: 0.12 mm |
| CS3: 21 TO 30 um | SH13: 0.11 mm |
| CS4: 31 TO 40 um | SH14: 0.10 mm |

METHOD OF MANUFACTURING MAGNETIC DISK DEVICE AND MAGNETIC DISK DEVICE

CROSS-REFERENCE TO RELATED APPLICATIONS

This application is based upon and claims the benefit of priority from Japanese Patent Application No. 2024-004508, filed on Jan. 16, 2024; the entire contents of which are incorporated herein by reference.

FIELD

An embodiment described herein relates generally to a method of manufacturing a magnetic disk device and the magnetic disk device.

BACKGROUND

A plurality of magnetic disks is assembled in parallel in a magnetic disk device along an axial direction of a spindle which rotates the magnetic disks. In recent years, magnetic disks have been increasingly thinned and multilayered in order to meet the demand for higher capacity of the magnetic disk device. This causes the magnetic disks to be easily warped, and makes it difficult to secure a design margin of the magnetic disk device.

BRIEF DESCRIPTION OF THE DRAWINGS

FIG. 1 is a schematic diagram illustrating one example of a configuration of a magnetic disk device according to an embodiment;

FIGS. 5A to 5D are schematic diagrams illustrating magnetic disks distributed to different cassette cases in accordance with flatnesses at the time when the magnetic disk device according to the embodiment is manufactured;

FIG. 6 illustrates one example of types of shims used for manufacturing the magnetic disk device according to the embodiment;

FIGS. 7A to 7D are schematic diagrams illustrating a process of assembling the magnetic disks to a spindle in the magnetic disk device according to the embodiment;

FIG. 11 illustrates one example of types of the shim used for manufacturing the magnetic disk device according to Variation 1 of the embodiment;

DETAILED DESCRIPTION

Figure 2:
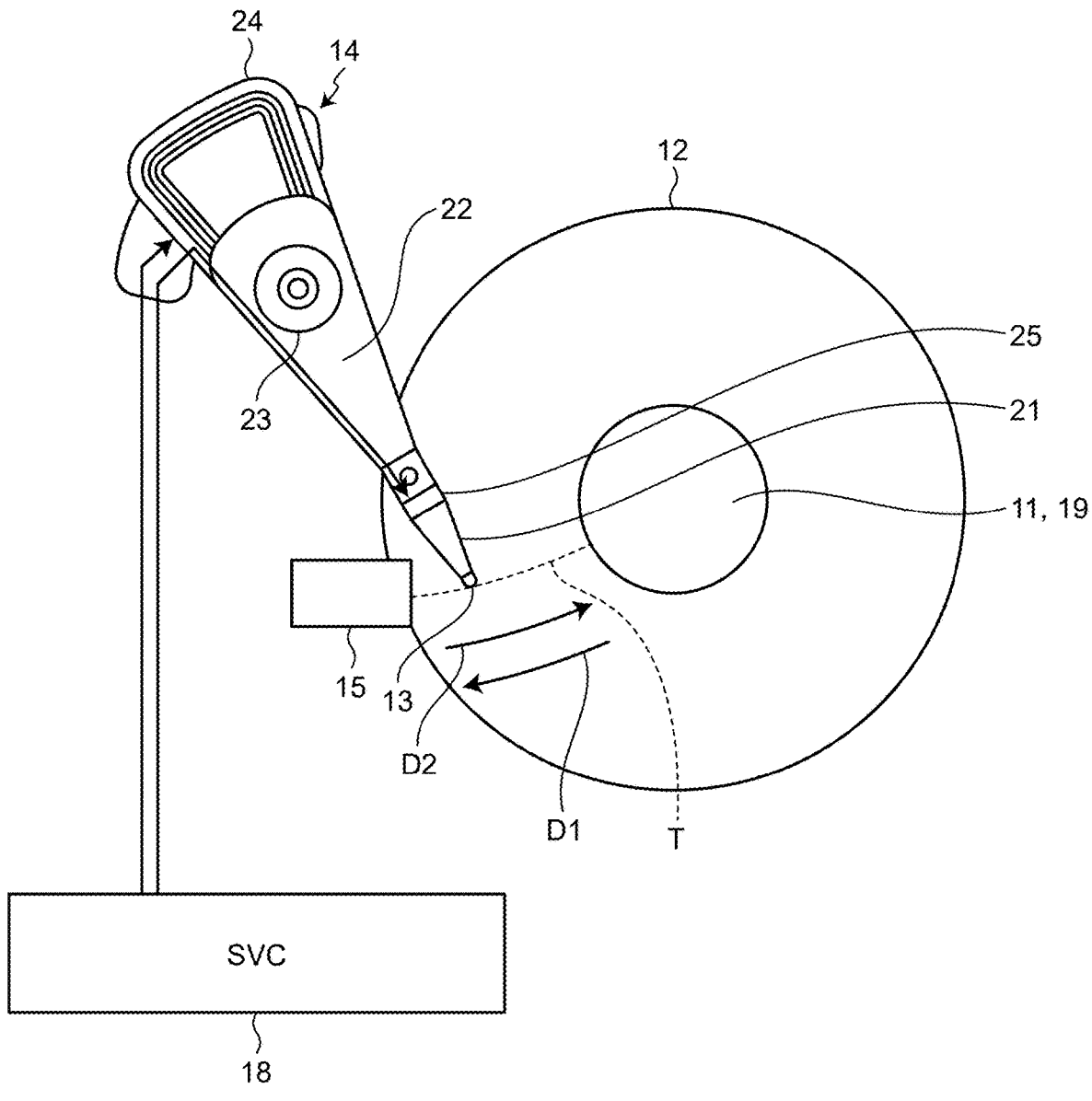
FIG. 2 is a top view schematically illustrating a partial configuration of the magnetic disk device according to the embodiment.

A method of manufacturing a magnetic disk device of an embodiment includes: adjusting relative heights of a spindle and a plurality of ramps, the spindle being allowed to rotate in a state in which center axes of a plurality of magnetic disks having ends deviating from a geometrical plane with a center point as a reference are aligned, the plurality of ramps being arranged at end positions of the plurality of magnetic disks; and assembling the plurality of magnetic disks along an axial direction of the spindle in a state in which directions of deviations of the ends from the center point are aligned.

The present invention will be described in detail below with reference to the drawings. Note that the present invention is not limited by the following embodiment. Furthermore, components in the following embodiment include those that can be easily assumed by those skilled in the art or those that are substantially the same.

Configuration Example of Magnetic Disk Device

Figure 1:
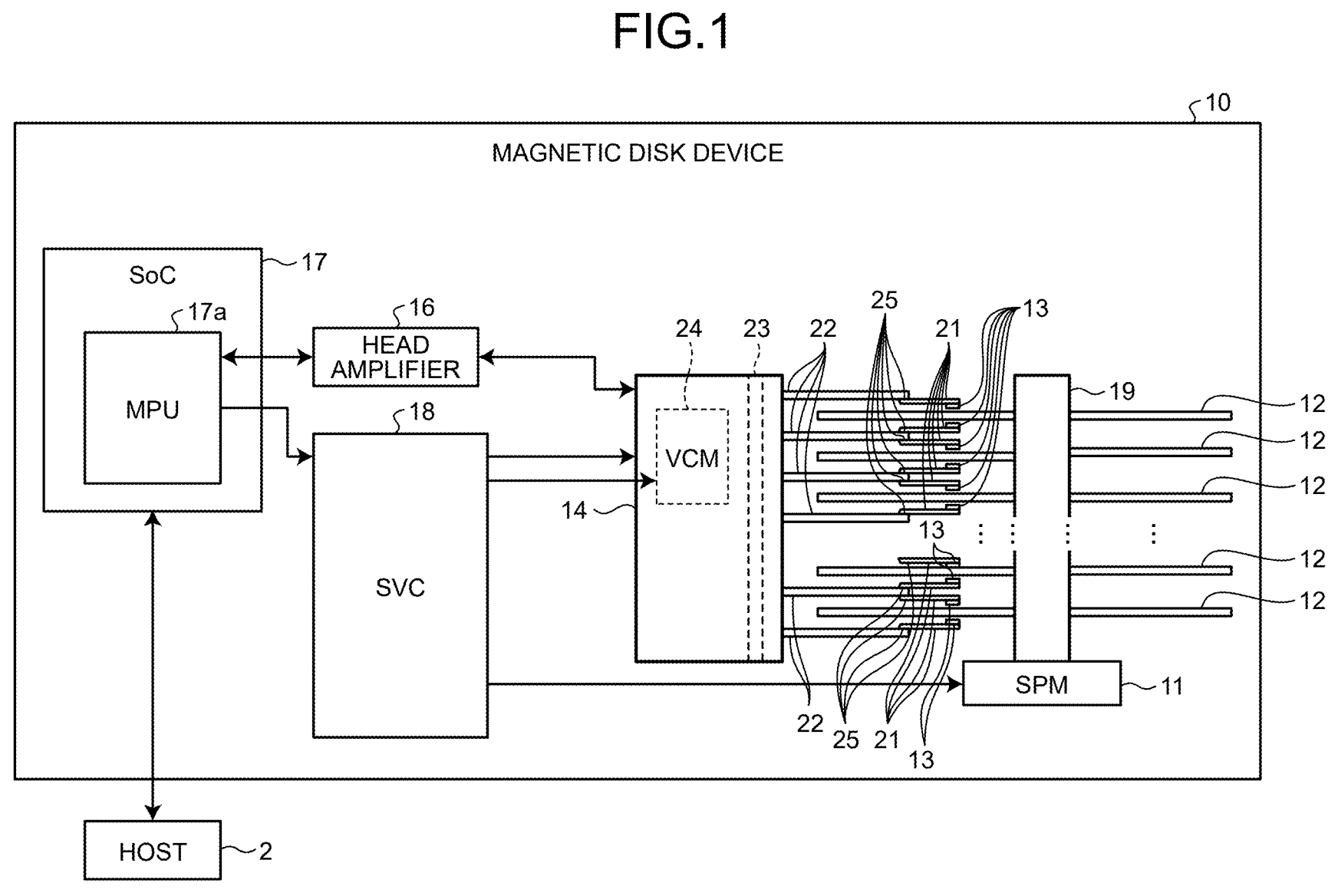

FIG. 1 is a schematic diagram illustrating one example of a configuration of a magnetic disk device 10 according to the embodiment. The magnetic disk device 10 of the embodiment is configured as, for example, a hard disk drive (HDD). Note, however, that the magnetic disk device 10 of the embodiment may be another magnetic disk device such as a hybrid HDD.

As illustrated in FIG. 1, the magnetic disk device 10 of the embodiment includes a spindle motor (SPM) 11, a plurality of magnetic disks 12, a plurality of magnetic heads 13, an actuator unit 14, a head amplifier 16, a system on chip (SoC) 17, and a servo controller (SVC) 18.

The spindle motor 11 includes a spindle 19 serving as a rotation shaft. A plurality of magnetic disks 12 is held by the spindle 19 by a clamp or the like. The spindle motor 11 integrally rotates the plurality of magnetic disks 12 around the spindle 19. Recording surfaces capable of recording data are formed on both surfaces of the plurality of magnetic disks 12.

The plurality of magnetic heads 13 is provided near both the recording surfaces of the individual magnetic disks 12 so as to be able to access the recording surfaces of these magnetic disks 12. That is, the number of the magnetic heads 13 is set to correspond to the number of the recording surfaces of the magnetic disks 12, for example. Each of the plurality of magnetic heads 13 can record data and reproduce data on a recording surface of a corresponding magnetic disk 12.

Each of the plurality of magnetic heads 13 is provided so as to be able to face a recording surface of a corresponding magnetic disk 12. Each of the plurality of magnetic heads 13 can record data and reproduce data on a recording surface of a magnetic disk 12 which the magnetic head 13 faces.

The actuator unit 14 includes a plurality of suspensions 21, a plurality of actuator arms 22, a rotation shaft 23, a voice coil motor (VCM) 24, and a plurality of microactuators (MA) 25.

The numbers of the suspensions 21, the actuator arms 22, and the microactuators 25 are set to correspond to the number of the magnetic heads 13. The rotation shaft 23 of the actuator unit 14 is provided substantially in parallel to the spindle 19 at a position separated from the spindle 19 of the spindle motor 11.

Each of the plurality of suspensions 21 has a shape of an elastically deformable plate. Each of the plurality of suspensions 21 supports corresponding one of the plurality of magnetic heads 13 near the tip.

One end of each of the plurality of actuator arms 22 is supported by the rotation shaft 23 such that each of the plurality of actuator arms 22 can rotate around the rotation shaft 23. Corresponding one of the plurality of suspensions 21 is attached to the other end of each of the plurality of actuator arms 22.

The microactuators 25 are provided at portions of connections between the suspensions 21 and the actuator arms 22. The microactuators 25 are actuator elements such as piezoelectric elements. The microactuators 25 can move the suspensions 21 substantially in parallel to the recording surfaces of the magnetic disks 12.

The voice coil motor 24 can rotate the actuator arms 22 around the rotation shaft 23 to move the magnetic heads 13 supported by the suspensions 21 on the magnetic disks 12. Note that the actuator unit 14 may include a plurality of voice coil motors 24.

As described above, the actuator unit 14 is configured as a two-stage actuator that moves the magnetic heads 13 with the voice coil motor 24 and the microactuators 25.

The head amplifier 16 amplifies signals read from the magnetic disks 12 by the magnetic heads 13, and outputs the signals to the SoC 17. The SoC 17 demodulates the signals output from the head amplifier 16 into pieces of digital data with a read channel circuit.

Furthermore, signals corresponding to the pieces of digital data are supplied from the SoC 17 to the head amplifier 16. The head amplifier 16 amplifies the signals supplied from the SoC 17, and supplies the signals to the magnetic heads 13. The magnetic heads 13 record the signals supplied from the head amplifier 16 on the recording surfaces of the magnetic disks 12.

The servo controller 18 controls the voice coil motor 24 and the microactuators 25 of the actuator unit 14. That is, the servo controller 18 drives the actuator unit 14 based on an instruction from the SoC 17 to position the magnetic heads 13 at positions about which the SoC 17 has given an instruction.

More specifically, the servo controller 18 applies a voltage corresponding to an instruction value of a driving voltage of the voice coil motor 24 to the voice coil motor 24, and applies voltages corresponding to instruction values of driving voltages of the microactuators 25 to the microactuators 25. This causes the magnetic heads 13 to be positioned at target positions.

Furthermore, the servo controller 18 drives the spindle motor 11 based on an instruction from the SoC 17. The servo controller 18 drives the spindle motor 11 such that the rotation speed of the spindle motor 11 is constant at a predetermined target speed.

Furthermore, the servo controller 18 retracts the magnetic heads 13 when power supply to the magnetic disk device 10 is cut off. The servo controller 18 may retract the magnetic heads 13 when a seek error occurs in positioning control of the magnetic heads 13.

The SoC 17 includes a micro-processing unit (MPU) 17a. The MPU 17a operates in accordance with a firmware program. The firmware program is stored in a predetermined non-volatile storage area. The predetermined non-volatile storage area may be the magnetic disks 12 or a read only memory (ROM) of the SoC 17.

The MPU 17a controls the entire operation of the magnetic disk device 10. For example, the MPU 17a controls access to the magnetic disks 12 using the magnetic heads 13 via the head amplifier 16. Furthermore, the MPU 17a instructs the servo controller 18 to control rotation of the spindle motor 11, and controls load/unload of the actuator unit 14 via the servo controller 18.

Furthermore, in positioning control, the MPU 17a calculates the instruction value of the driving voltage of the voice coil motor 24 and the instruction values of the driving voltages of the microactuators 25 in order to cause the positions of the magnetic heads 13 to follow target positions. The MPU 17a calculates instruction values by using position signals read by the magnetic heads 13 from servo information formed on the recording surfaces of the magnetic disks 12 as feedback input, and transmits the obtained instruction values to the servo controller 18.

The SoC 17 configured as described above is electrically connected to a host 2, and can receive an access command (e.g., read command and write command) from the host 2. The SoC 17 interprets the access command from the host 2, and executes various controls on, for example, accesses to the magnetic disks 12 as described above based on the interpretation result.

The SoC 17 and the host 2 perform communication via a communication line by using, for example, a communication protocol conforming to a serial attached SCSI (SAS) standard. Note, however, that the standard of the communication line between the SoC 17 and the host 2 is not limited to the example.

The host 2 is configured as, for example, a processor, a personal computer, or a server.

FIG. 2 is a top view schematically illustrating a partial configuration of the magnetic disk device 10 according to the embodiment. FIG. 2 illustrates the spindle motor (SPM) 11, the plurality of magnetic disks 12, the plurality of magnetic heads 13, and the actuator unit 14 in a housing of the magnetic disk device 10 as viewed from above.

As illustrated in FIG. 2, the actuator unit 14 can move the magnetic heads 13 along a trajectory T on the recording surfaces of the magnetic disks 12 with the voice coil motor 24 and the microactuators 25. A ramp load mechanism 15 is provided on the trajectory T near the outer ends of the magnetic disks 12.

The voice coil motor 24 rotates the actuator arms 22 and the suspensions 21 attached to the actuator arms 22 in an arc shape within a predetermined range around the rotation shaft 23. In the case, the voice coil motor 24 moves the actuator arms 22 substantially in parallel to the recording surfaces of the magnetic disks 12. That is, the voice coil motor 24 moves the magnetic heads 13 in a radial direction substantially orthogonal to the spindle 19 on the magnetic disks 12.

This enables the magnetic heads 13 to move on trajectories D1 and D2 between the ramp load mechanism 15 and the spindle 19.

The ramp load mechanism 15 is provided near the end positions of the magnetic disks 12. The magnetic heads 13 are loaded to/unloaded from the magnetic disks 12 via the ramp load mechanism 15.

As described above, the magnetic disk device 10 has a configuration in which the plurality of magnetic disks 12 is assembled in parallel along the axial direction of the spindle 19. The plurality of magnetic disks 12 is increasingly thinned, and easily warped. In the magnetic disk device 10 of the embodiment, the magnetic disks 12 are assembled to the spindle 19 with the warpage directions thereof being aligned for the magnetic disks 12 having a warpage amount within a predetermined range.

Here, the magnetic disks 12 are often warped to have a bowl shape as a whole. That is, amounts of warpages of the magnetic disks 12 can be expressed by amounts of deviations (displacements) of the ends of the magnetic disks 12 from a geometrical plane with the center points of the magnetic disks 12 as references, for example. In the case, for example, amounts of deviations at a plurality of ends of the magnetic disks 12 are measured. The maximum value thereof can be set as a deviation amount. Alternatively, an average value of amounts of deviations measured at a plurality of ends may be set as a deviation amount.

In the present specification, amounts of deviations of the ends of the magnetic disks 12 from the geometrical plane with the center points of the magnetic disks 12 as references will be hereinafter referred to as flatnesses of the magnetic disks 12.

FIGS. 3A to 4B illustrate, below, examples of a case where magnetic disks 12 having a flatness of a predetermined value or less are assembled and a case where magnetic disks 12 having a flatness within a predetermined range are assembled.

Figure 3A:
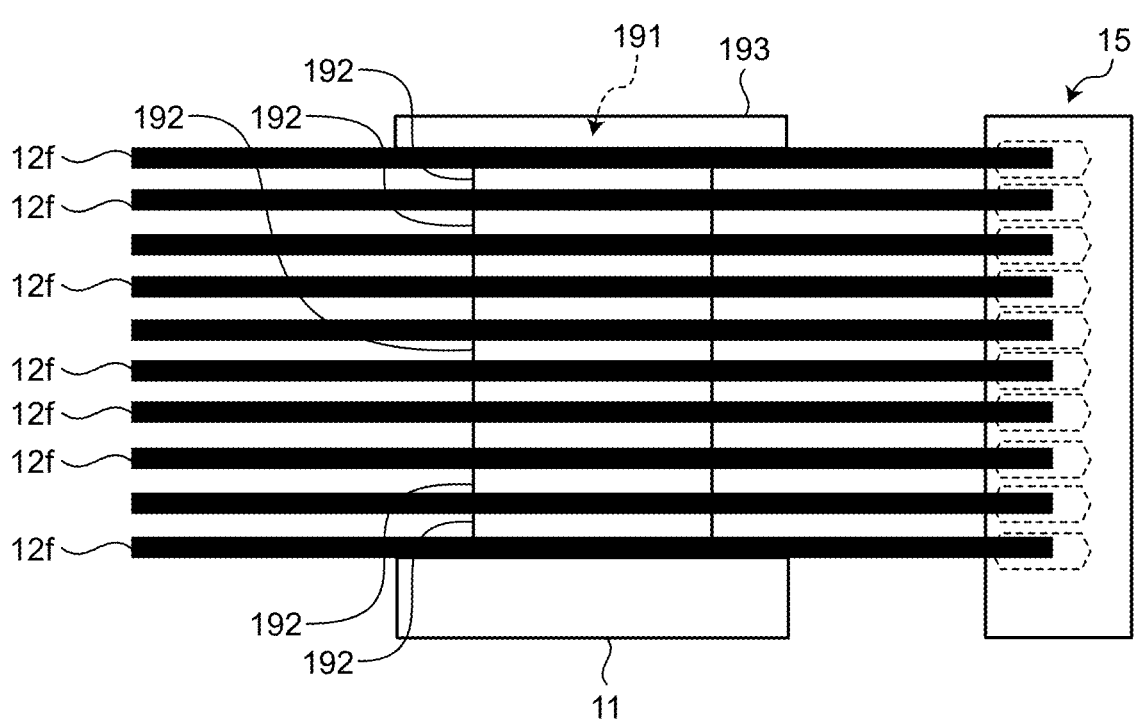
FIGS. 3A and 3B are schematic diagrams illustrating an example of a case where magnetic disks having a flatness of a predetermined value or less are assembled in the magnetic disk device according to the embodiment.
Figure 3B:
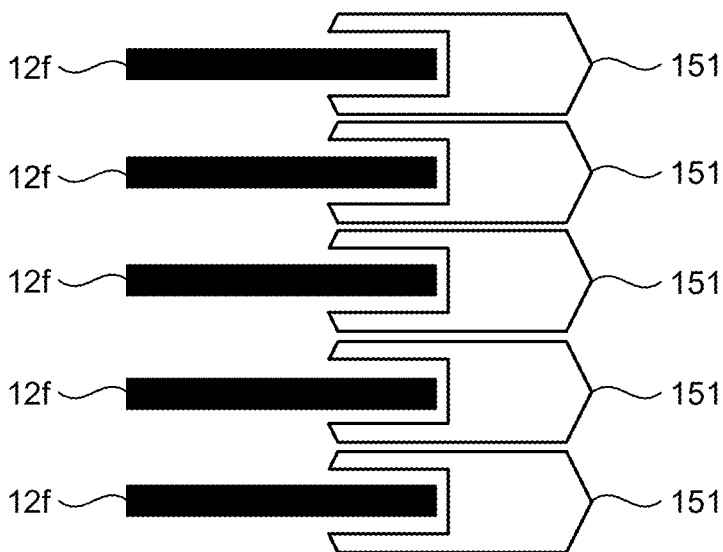

FIGS. 3A and 3B are schematic diagrams illustrating an example of a case where magnetic disks 12f having a flatness of a predetermined value or less are assembled in the magnetic disk device 10 according to the embodiment. FIG. 3A illustrates a whole picture of the plurality of magnetic disks 12f assembled to the spindle 19. FIG. 3B illustrates an enlarged cross section of the ramp load mechanism 15 provided near ends of the plurality of magnetic disks 12f.

The magnetic disk device 10 in FIGS. 3A and 3B includes the plurality of magnetic disks 12f. Each of these magnetic disks 12f has a flatness of a predetermined value or less, and has an amount of deviation at an end of substantially zero from the geometrical plane with a center point as a reference. That is, the magnetic disks 12f have little warpage, and has a substantially flat shape.

As illustrated in FIGS. 3A and 3B, a hub 191 serving as a shaft portion of the spindle 19 is provided on the spindle motor 11 of the magnetic disk device 10. The plurality of magnetic disks 12f is assembled to the hub 191 at substantially equal intervals via spacers 192. An upper end of the hub 191 to which the magnetic disks 12f are assembled is covered and tightened with a clamp 193, which causes the plurality of magnetic disks 12f to be assembled to the spindle 19 including the hub 191, the spacers 192, and the clamp 193.

The ramp load mechanism 15 is provided near the ends of the magnetic disks 12f separated from the spindle 19 by a predetermined distance. The ramp load mechanism 15 includes a plurality of ramps 151. These ramps 151 have grooves into which the ends of the magnetic disks 12f are inserted in a non-contact manner, and are installed at substantially equal intervals in the vertical direction so as to correspond to the individual magnetic disks 12f.

Each of the plurality of magnetic disks 12f has an end at a substantially central portion in the vertical direction in a groove of a corresponding ramp 151. That is, the ends of the individual magnetic disks 12f are inserted into the grooves while maintaining substantially equal distances to both the upper surfaces and the lower surfaces of the grooves. These distances are maintained substantially uniformly between the plurality of magnetic disks 12f.

The above-described magnetic heads 13 are housed in the ramp load mechanism 15, and is loaded to/unloaded from the magnetic disks by moving back and forth on the ramp 151 provided near the ends of the corresponding magnetic disks 12f.

As described above, in the magnetic disk device 10 of the embodiment, initial relative heights of the spindle 19 and the plurality of ramps 151 are optimized in a case where the substantially flat magnetic disks 12 are assembled.

Figure 4A:
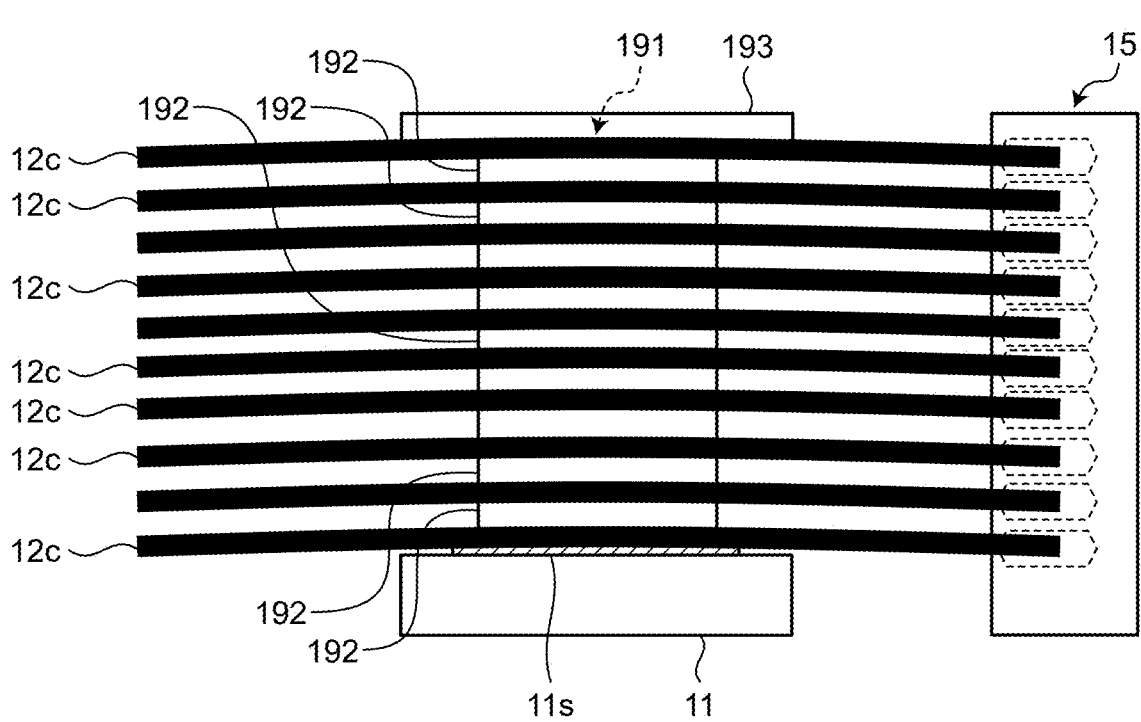
FIGS. 4A and 4B are schematic diagrams illustrating an example of a case where magnetic disks having a flatness within a predetermined range are assembled in the magnetic disk device according to the embodiment.
Figure 4B:
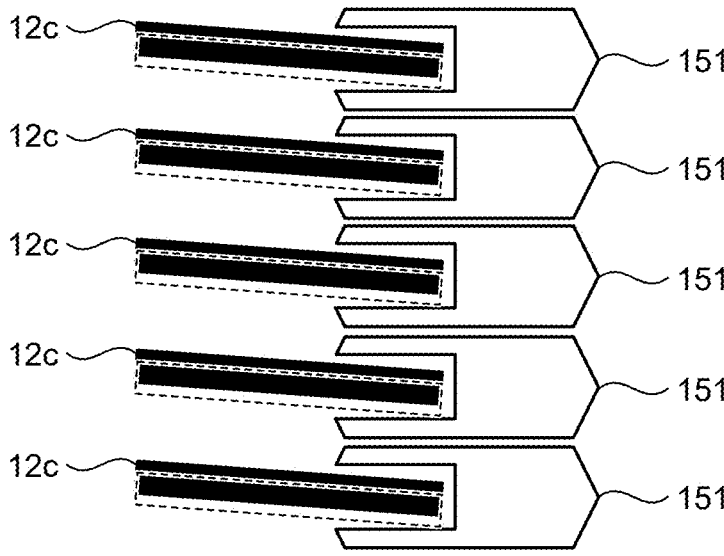

FIGS. 4A and 4B are schematic diagrams illustrating an example of a case where magnetic disks 12c having a flatness within a predetermined range are assembled in the magnetic disk device 10 according to the embodiment. FIG. 4A illustrates a whole picture of the plurality of magnetic disks 12c assembled to the spindle 19. FIG. 4B illustrates an enlarged cross section of the ramp load mechanism 15 provided near ends of the plurality of magnetic disks 12c.

The magnetic disk device 10 in FIGS. 4A and 4B includes the plurality of magnetic disks 12c. All these magnetic disks 12c have a flatness that is larger than those of the magnetic disks 12f in FIGS. 3A and 3B above and that is within a predetermined range. That is, the magnetic disks 12c have a predetermined amount of warpage, and has a bowl shape as a whole.

As illustrated in FIGS. 4A and 4B, these magnetic disks 12c are assembled to the spindle 19 of the magnetic disk device 10 with directions of deviations of the ends from the center point being aligned. In the examples of FIGS. 4A and 4B, all the magnetic disks 12c are assembled to the spindle 19 such that the deviations of the ends from the center point are in a downward direction in all the magnetic disks 12c, that is, in a direction in which all the magnetic disks 12c have upwardly protruding shapes like bowls turned upside down.

The configurations of the spindle 19, the ramp load mechanism 15, and the like in FIGS. 4A and 4B are housed in a housing (all not illustrated) in which a top cover and a base member are joined. More specifically, the spindle 19, the ramp load mechanism 15, and the like are installed on the base member of the housing of the magnetic disk device 10, and covered with the top cover. In the present specification, the top cover side is defined as an upper direction of the magnetic disk device 10. The base member side is defined as a lower direction of the magnetic disk device 10.

When the magnetic disks 12c are assembled such that the deviations of the ends from the center point are in a downward direction as described above, the direction of the deviations of the ends of the magnetic disks 12c may be called a base member direction with the magnetic disk device 10 as a reference. That is, in the magnetic disk device 10 in FIGS. 4A and 4B, the ends of the magnetic disks 12c have predetermined amounts of deviations (displacements) of the magnetic disks 12c from the center point in the base member direction.

Furthermore, a doughnut-shaped shim 11s having a predetermined thickness is inserted on the spindle motor 11, that is, at the lower end of the hub 191 of the spindle 19. This causes the spindle 19 and the plurality of entire magnetic disks 12c assembled to the spindle 19 to be raised in the upper direction by the thickness of the shim 11s.

Here, the magnetic disks 12 include those made of aluminum and those made of glass. When the magnetic disks 12 are made of aluminum, the spindle 19 including the hub 191 made of aluminum is usually used. Therefore, the shim 11s is also preferably made of aluminum. Furthermore, when the magnetic disks 12 are made of glass, the spindle 19 including the hub 191 made of SUS is used. Therefore, the shim 11s is also preferably made of SUS.

When the plurality of magnetic disks 12c is assembled to the spindle 19 in a shape of, for example, a bowl turned upside down and the relative heights of the spindle 19 and the magnetic disks 12c and the ramp load mechanism 15 are as indicated in FIGS. 3A and 3B, the ends of these magnetic disks 12c deviate downward in the grooves of the corresponding ramps 151, and the distances to lower surfaces of the grooves are shortened as compared to the distances to upper surfaces thereof. Broken lines in FIG. 4B indicate such a state of the magnetic disks 12c. Such a state reduces contact margins between the magnetic disks 12c and the ramps 151, and increases contact risks thereof.

In the magnetic disk device 10 of the embodiment, as described above, the shim 11s is inserted at the lower end of the spindle 19 to raise the spindle 19 and the magnetic disks 12c. This causes the relative heights of the spindle 19 and the magnetic disks 12c and the ramp load mechanism 15 to be adjusted, and causes the ends of the individual magnetic disks 12f to be inserted into the grooves while maintaining distances substantially equal to both the upper surfaces and the lower surfaces of the grooves of the corresponding ramps 151. These distances are maintained substantially uniformly in the plurality of magnetic disks 12c.

Furthermore, when the magnetic disks 12c are made of aluminum, the shim 11s is also made of aluminum. When the magnetic disks 12c are made of SUS, the shim 11s is made of SUS. Thermal expansion coefficients thereof can thereby be substantially equalized. This can reduce risks of contacts due to thermal expansion between mutual members such as the magnetic disks 12c, the spindle 19, and the shim 11s.

Method of Manufacturing Magnetic Disk Device

Next, an example of a method of manufacturing the magnetic disk device 10 of the embodiment will be described with reference to FIGS. 5A to 8D.

As described above, the magnetic disks 12 are increasingly thinned, and easily warped. The individual magnetic disks 12 have different flatnesses due to manufacturing tolerance and the like. Therefore, when the magnetic disks 12 are manufactured, the flatnesses of the individual magnetic disks 12 are measured by performing total inspection with a plane measuring machine and the like after a polish process is finished.

FIGS. 5A to 5D are schematic diagrams illustrating the magnetic disks 12 distributed to different cassette cases CS in accordance with flatnesses at the time when the magnetic disk device 10 according to the embodiment is manufactured. As illustrated in FIGS. 5A to 5D, the individual magnetic disks 12 are distributed to the different cassette cases CS in accordance with flatnesses.

In the example of FIGS. 5A to 5D, a cassette case CS1 houses the magnetic disks 12 having a flatness range of 0 μm or more and 10 μm or less. A cassette case CS2 houses the magnetic disks 12 having a flatness range of 11 μm or more and 20 μm or less. A cassette case CS3 houses the magnetic disks 12 having a flatness range of 21 μm or more and 30 μm or less. A cassette case CS4 houses the magnetic disks 12 having a flatness range of 31 μm or more and 40 μm or less.

These magnetic disks 12 are housed in the cassette cases CS1 to CS4 with directions of deviations of the ends being aligned. One cassette case CS houses magnetic disks 12 for a plurality of magnetic disk devices 10, for example. Therefore, when one magnetic disk device 10 is manufactured, assembly is performed by using some magnetic disks 12 in one cassette case CS.

In a process of manufacturing the magnetic disk device 10 of the embodiment, shims 11s having different thicknesses are prepared and used for each of different flatness ranges.

FIG. 6 illustrates one example of types of the shims 11s used for manufacturing the magnetic disk device 10 according to the embodiment. As illustrated in FIG. 6, the shims 11s having a plurality of types of thicknesses in accordance with the flatnesses are prepared in accordance with the flatness ranges of the magnetic disks 12.

A shim 11s having a thickness SH1 of, for example, 0.10 mm is prepared for the magnetic disks 12 housed in the cassette case CS1 and having a flatness range of 0 μm or more and 10 μm or less. A shim 11s having a thickness SH2 of, for example, 0.11 mm is prepared for the magnetic disks 12 housed in the cassette case CS2 and having a flatness range of 11 μm or more and 20 μm or less. A shim 11s having a thickness SH3 of, for example, 0.12 mm is prepared for the magnetic disks 12 housed in the cassette case CS3 and having a flatness range of 21 μm or more and 30 μm or less. A shim 11s having a thickness SH4 of, for example, 0.13 mm is prepared for the magnetic disks 12 housed in the cassette case CS4 and having a flatness range of 31 μm or more and 40 μm or less.

FIGS. 7A to 8D are schematic diagrams illustrating a process of assembling the magnetic disks 12 to the spindle 19 in the magnetic disk device 10 according to the embodiment.

As illustrated in FIG. 7A, one of the cassette cases CS in which the magnetic disks 12 having a flatness within a predetermined range are housed is selected. In contrast, the hub 191 of the spindle 19 is installed on the spindle motor 11 via a shim 11s having a thickness in accordance with the flatnesses of the magnetic disks 12 in the cassette case CS.

As illustrated in FIG. 7B, the first magnetic disk 12 is taken out from the cassette case CS, and set in the hub 191 in which the shim 11s is inserted at the lower end. In the case, the magnetic disks 12 are set, for example, in a direction in which a bowl is turned upside down.

As illustrated in FIG. 7C, the spacer 192 is set on the first magnetic disk 12.

As illustrated in FIG. 7D, the second magnetic disk 12 is taken out from the cassette case CS, and set on the hub 191 on the first magnetic disk 12 via the spacer 192. Also in the case, the second magnetic disk 12 is set, for example, in the direction in which a bowl is turned upside down in accordance with the direction of the first magnetic disk 12.

Figures 8A, 8B, 8C, 8D:
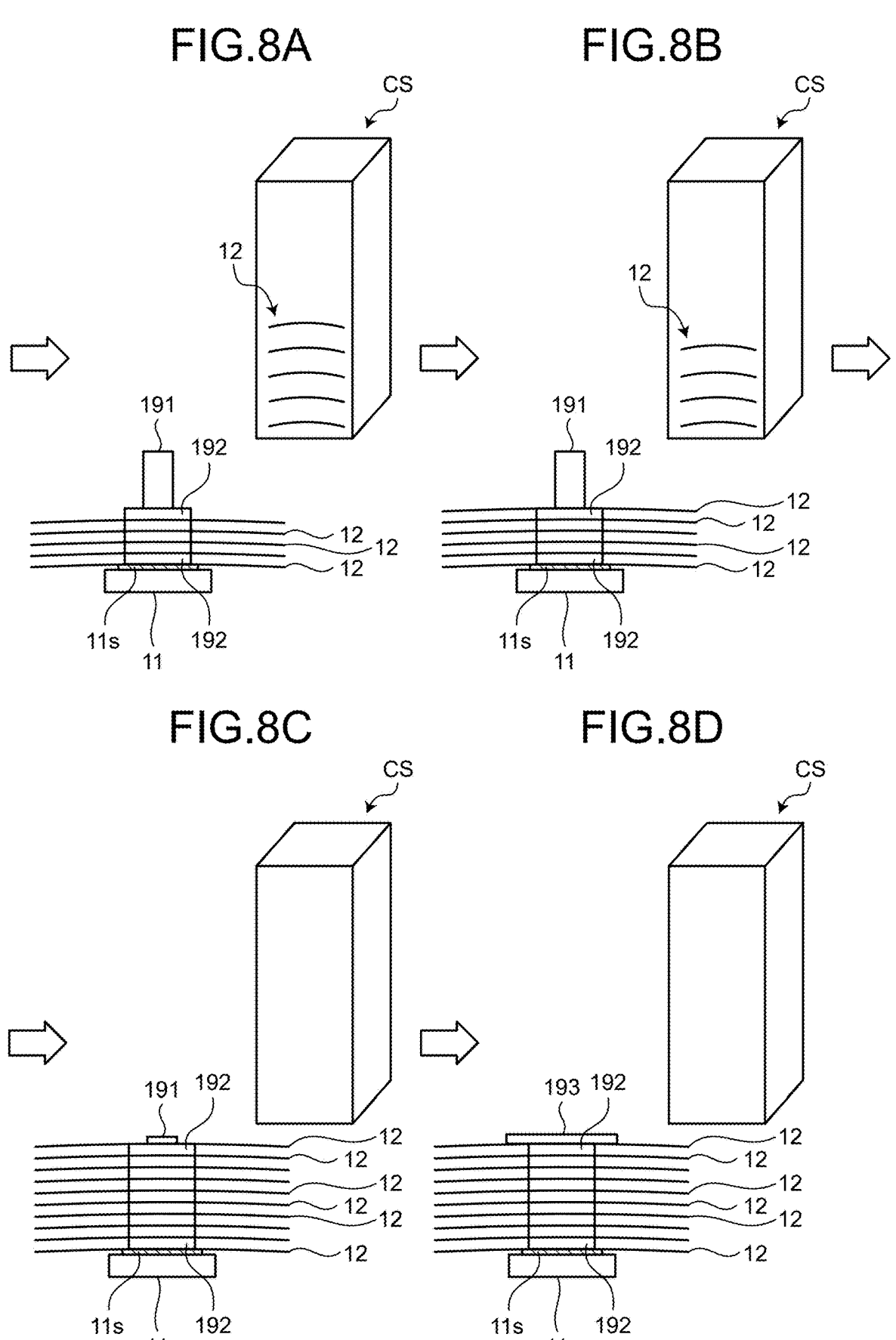
FIGS. 8A to 8D are schematic diagrams illustrating the process of assembling the magnetic disks to the spindle in the magnetic disk device according to the embodiment.

As illustrated in FIGS. 8A to 8C, processing of setting a magnetic disk 12 in the hub 191 via the spacer 192 is continued until the last magnetic disk 12.

As illustrated in FIG. 8D, when all the magnetic disks 12 are set to the hub 191, the upper end of the hub 191 is tightened with the clamp 193. This causes the plurality of magnetic disks 12 having a flatness within a predetermined range to be assembled to the spindle 19 with the deviation directions being aligned. Note that amounts of warpages of the magnetic disks 12 on at least an upper layer side are slightly reduced by tightening the upper end of the hub 191 with the clamp 193.

As described above, processes of assembling the magnetic disk device 10 of the embodiment is finished.

COMPARATIVE EXAMPLE

Figure 9A:
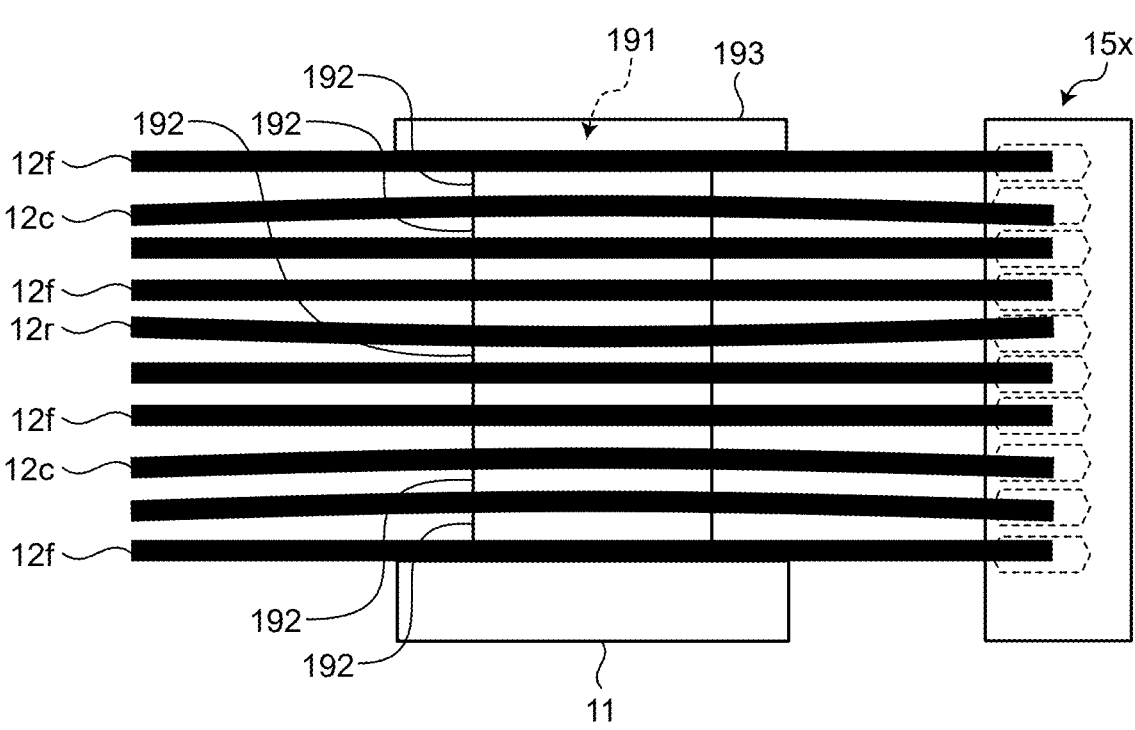
FIGS. 9A and 9B are schematic diagrams illustrating an example of a case where magnetic disks are randomly assembled without considering the magnitude of flatnesses, deviation directions, and the like in the magnetic disk device according to a comparative example.
Figure 9B:
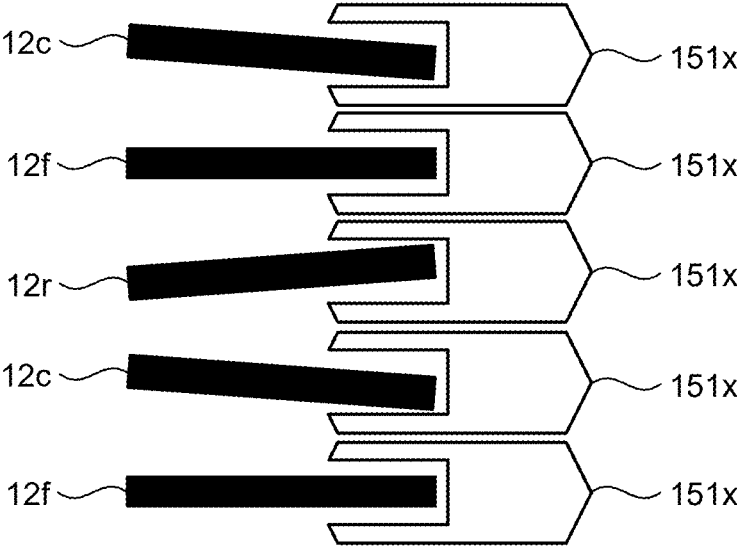

Next, the magnetic disk device of a comparative example will be described with reference to FIGS. 9A and 9B. As illustrated in FIGS. 9A and 9B, in the magnetic disk device of the comparative example, the plurality of magnetic disks 12 is randomly assembled to the spindle 19 without considering the magnitude of flatnesses, deviation directions, and the like. This causes the substantially flat magnetic disks 12f, the magnetic disks 12c in a direction of a bowl turned upside down, and magnetic disks 12r having upward bowl shapes to be mixed on one spindle 19.

In this case, ends of the substantially flat magnetic disks 12f are arranged at substantially central portions in the vertical direction in grooves of corresponding ramps 151x of a ramp load mechanism 15x. Ends of the magnetic disks 12c having a shape of a bowl turned upside down deviate downward in grooves of ramps 151x. Ends of the bowl-shaped magnetic disks 12r deviate upward in grooves of ramps 151x.

Gaps between the magnetic disks 12 and upper and lower surfaces of the grooves of the ramps 151x have narrowed due to the increasingly thinned and multilayered magnetic disks 12. An increase in amounts of warpages of the thinned magnetic disks 12 increases risks of contacts between the magnetic disks 12 and the ramps 151x. An external impact applied to the magnetic disk device further increases these contact risks. Operation impact resistance is decreased to impair reliability of the magnetic disk device.

Furthermore, warpages of the randomly arranged magnetic disks 12 causes portions where the gaps between the magnetic disks 12 and the upper and lower surfaces of the grooves of the ramps 151x are narrowed and portions where the gaps are widened to be mixed, which makes it difficult to secure a design margin of the magnetic disk device.

According to the method of manufacturing the magnetic disk device 10 of the embodiment, the relative heights of the spindle 19 and the plurality of ramps 151 are adjusted. The plurality of magnetic disks 12 having ends deviating from the geometrical plane with the center point as a reference is assembled in parallel along the axial direction of the spindle 19 with the directions of deviations of the ends from the center point being aligned.

As described above, the magnetic disks 12 are assembled to the spindle 19 with the directions of deviations of the ends from the center point being aligned. Gaps between the individual magnetic disks 12 and corresponding ramps 151 can thus be substantially uniformly aligned. In the case, the directions of deviations of the ends from the center point are aligned. When the spindle 19 and the plurality of ramps 151 have initial relative heights, gaps between the magnetic disks 12 and the ramps 151 are narrowed in both the directions of warpages of the magnetic disks 12 with regularity.

In addition, even when the plurality of magnetic disks 12 having ends deviating from the geometrical plane with the center point as a reference is assembled, the gaps between these magnetic disks 12 and the corresponding ramps 151 can be appropriately maintained by adjusting the relative heights of the spindle 19 and the plurality of ramps 151. As described above, only aligning the directions of warpages of the plurality of magnetic disks 12 is not sufficient for reducing risks of contacts between the magnetic disks 12 and the ramps 151. Further adjusting the relative heights of the spindle 19 and the plurality of ramps 151 is necessary.

This can secure a design margin of the magnetic disk device 10, and reduce the risks of contacts between the magnetic disks 12 and the ramps 151 to improve impact resistance of the operating magnetic disk device 10.

According to the method of manufacturing the magnetic disk device 10 of the embodiment, the plurality of magnetic disks 12c is selected such that flatnesses thereof fall within a predetermined range. The shim 11s having a predetermined thickness in accordance with the flatnesses of the magnetic disks 12c is installed near a lower end of the spindle 19. The relative heights of the spindle 19 and the plurality of ramps 151 are adjusted. The directions of deviations of the ends are aligned such that the plurality of magnetic disks 12 protrudes upward. The plurality of magnetic disks 12 is assembled to the spindle 19 on which the shim 11s is installed.

The design margin of the magnetic disk device 10 is more easily secured by selecting the individual magnetic disks 12 in accordance with the flatnesses thereof.

Furthermore, for example, when the initial relative heights of the spindle 19 and the plurality of ramps 151 are optimized for the substantially flat magnetic disks 12, assembling the magnetic disks 12 to the spindle 19 such that the magnetic disks 12 protrude upward as described above causes the ends of the magnetic disks 12 to approach the lower surface sides of the ramps 151. In this case, the gaps between the magnetic disks 12 and the ramps 151 can be appropriately maintained by installing the shim 11s near the lower end of the spindle 19.

Furthermore, an advantage that the upwardly protruding shapes of the magnetic disks 12 are slightly corrected by the clamp 193 can be obtained by assembling the magnetic disks 12 to the spindle 19 such that the magnetic disks 12 protrude upward.

According to the method of manufacturing the magnetic disk device 10 of the embodiment, a plurality of shims 11s is prepared for groups of a plurality of magnetic disks having different flatness ranges. The plurality of shims 11s has different thicknesses which enable adjustments of the relative heights of the spindle 19 and the plurality of ramps 151. This enables the gaps between the magnetic disks 12 and the ramps 151 to be more appropriately maintained.

Variation 1

Next, the magnetic disk device of Variation 1 of the embodiment will be described with reference to FIGS. 10A to 11. The magnetic disk device of Variation 1 is different from that in the above-described embodiment in that the initial relative heights of the spindle 19 and the plurality of ramps 151 are optimized for the magnetic disks 12 having large warpage amounts.

In the following drawings, the same reference signs are attached to the same configurations as those of the above-described embodiment, and the description thereof may be omitted.

Figure 10A:
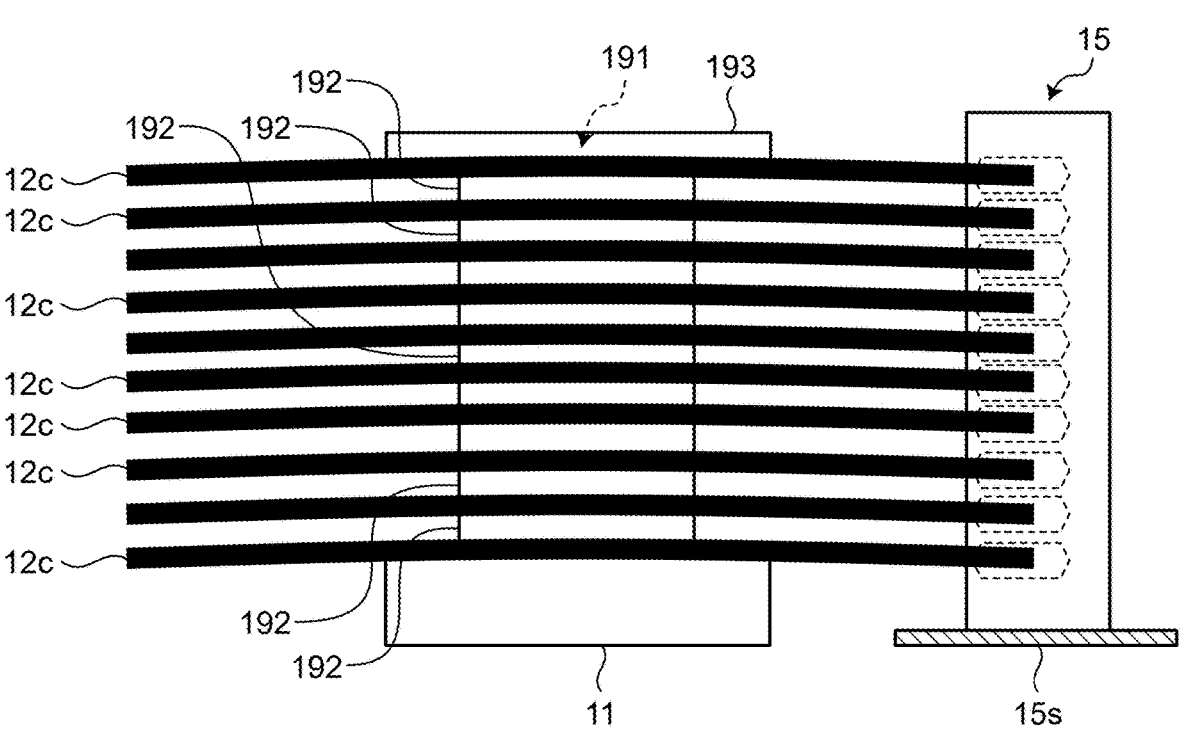
FIGS. 10A and 10B are schematic diagrams illustrating an example of a case where magnetic disks having a flatness within a predetermined range are assembled in the magnetic disk device according to Variation 1 of the embodiment.
Figure 10B:
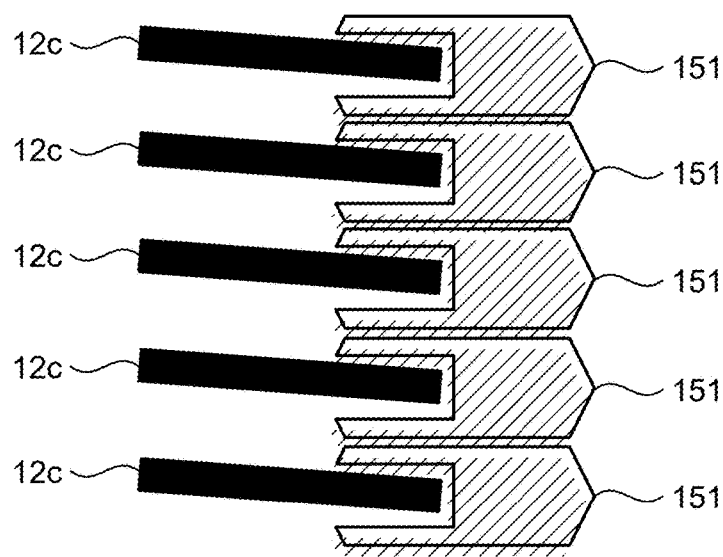

FIGS. 10A and 10B are schematic diagrams illustrating an example of a case where magnetic disks 12c having a flatness within a predetermined range are assembled in the magnetic disk device according to Variation 1 of the embodiment. FIG. 10A illustrates a whole picture of the plurality of magnetic disks 12c assembled to the spindle 19. FIG. 10B illustrates an enlarged cross section of the ramp load mechanism 15 provided near ends of the plurality of magnetic disks 12c.

In the example in FIGS. 10A and 10B, the initial relative heights of the spindle 19 and the plurality of ramps 151 are optimized for the magnetic disks 12 having the maximum amount of warpage which the magnetic disks 12 can have, for example. In this case, when the magnetic disks 12c having a warpage amount smaller than the maximum warpage amount are assembled, ends of the magnetic disks 12c are arranged near the upper surfaces of grooves of the corresponding ramps 151 at the initial relative heights of the spindle 19 and the plurality of ramps 151. The silhouette of the ramps 151 in FIG. 10B illustrates such a state of the magnetic disks 12c.

As illustrated in FIGS. 10A and 10B, in order to optimize the end positions of the magnetic disks 12c arranged as described above, when the magnetic disks 12c having a warpage amount smaller than the maximum warpage amount are assembled, a shim 15s having a thickness in accordance with the flatnesses of these magnetic disks 12c is inserted at the lower end of the ramp load mechanism 15. This causes the entire ramp load mechanism 15 including the plurality of ramps 151 to be raised upward, and can optimize the end positions of the magnetic disks 12c to the corresponding ramps 151.

Here, a base member of the magnetic disk device on which the ramp load mechanism 15 including the plurality of ramps 151 is installed is made of, for example, aluminum. Therefore, the shim 15s inserted between the ramp load mechanism 15 and the base member of the magnetic disk device is also preferably made of aluminum.

FIG. 11 illustrates one example of types of the shim 15s used for manufacturing the magnetic disk device according to Variation 1 of the embodiment. As illustrated in FIG. 11, the shims 15s having a plurality of types of thicknesses in accordance with the flatnesses are prepared in accordance with the flatness ranges of the magnetic disks 12 also in a process of manufacturing the magnetic disk device of Variation 1.

As in the example in FIGS. 5A to 5D described above, when the individual magnetic disks 12 are distributed, a shim 15s having a thickness SH1 of, for example, 0.13 mm is prepared for magnetic disks 12 having a flatness range of 0 µm or more and 10 µm or less. A shim 15s having a thickness SH2 of, for example, 0.12 mm is prepared for magnetic disks 12 having a flatness range of 11 µm or more and 20 µm or less. A shim 15s having a thickness SH3 of, for example, 0.11 mm is prepared for magnetic disks 12 having a flatness range of 21 µm or more and 30 µm or less. A shim 15s having a thickness SH4 of, for example, 0.10 mm is prepared for magnetic disks 12 having a flatness range of 31 µm or more and 40 µm or less.

This enables the relative heights of the spindle 19 and the plurality of ramps 151 to be optimized for the plurality of magnetic disks 12 having different flatness ranges by inserting the shim 15s having an appropriate thickness at the lower end of the ramp load mechanism 15 also in the magnetic disk device of Variation 1 including the spindle 19 and the plurality of ramps 151 whose initial relative heights are optimized for the magnetic disks 12 having the maximum warpage amount.

According to the magnetic disk device of Variation 1, effects similar to those of the magnetic disk device 10 of the embodiment described above are obtained.

Variation 2

Next, the magnetic disk device of Variation 2 of the embodiment will be described with reference to FIGS. 12A to 13B. The magnetic disk device of Variation 2 is different from that in the above-described embodiment in that the magnetic disks 12 are assembled to the spindle 19 so as to have an upward bowl shape.

In the following drawings, the same reference signs are attached to the same configurations as those of the above-described embodiment, and the description thereof may be omitted.

Figure 12A:
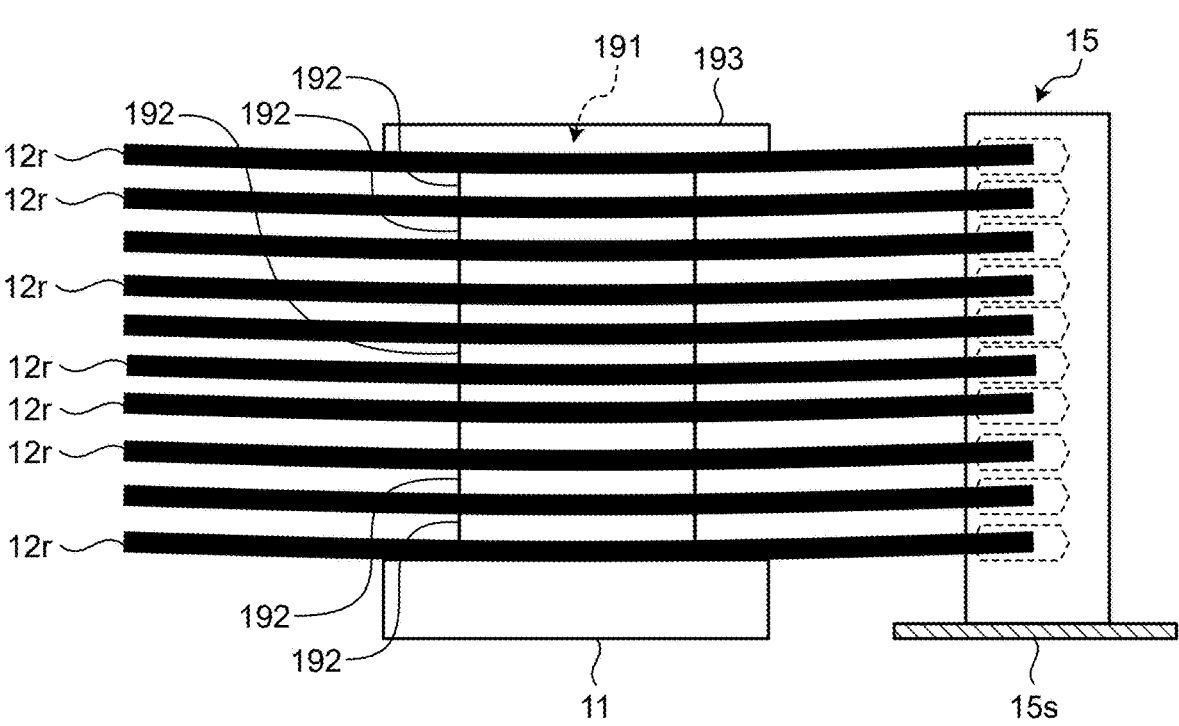
FIGS. 12A and 12B are schematic diagrams illustrating an example of a case where the magnetic disks having a flatness within a predetermined range are assembled in the magnetic disk device according to Variation 2 of the embodiment.
Figure 12B:
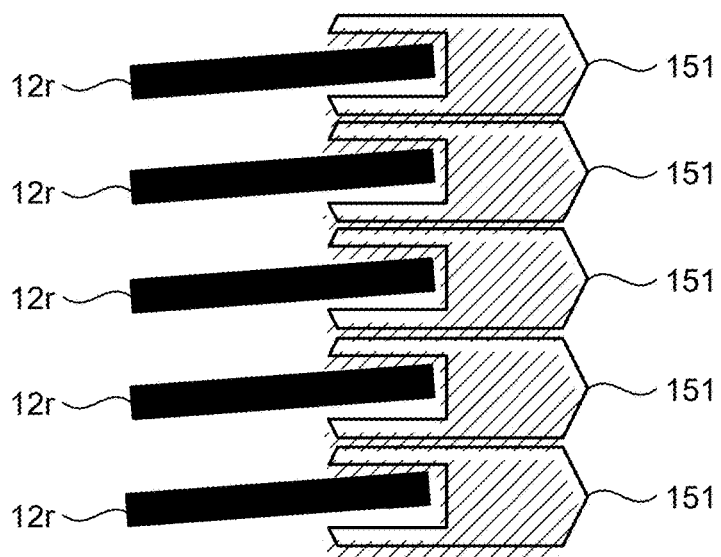

FIGS. 12A and 12B are schematic diagrams illustrating an example of a case where magnetic disks 12r having a flatness within a predetermined range are assembled in the magnetic disk device according to Variation 2 of the embodiment. FIG. 12A illustrates a whole picture of the plurality of magnetic disks 12r assembled to the spindle 19. FIG. 12B illustrates an enlarged cross section of the ramp load mechanism 15 provided near ends of the plurality of magnetic disks 12r.

In the example in FIGS. 12A and 12B, the initial relative heights of the spindle 19 and the plurality of ramps 151 are optimized for the substantially flat magnetic disks 12, for example. In this case, when the magnetic disks 12r not flat but having a predetermined flatness are assembled so as to have an upward bowl shape, that is, a downwardly protruding shape, ends of the magnetic disks 12r are arranged near the upper surfaces of grooves of the corresponding ramps 151 at the initial relative heights of the spindle 19 and the plurality of ramps 151. The silhouette of the ramp 151 in FIG. 12B illustrates such a state of the magnetic disks 12r.

As illustrated in FIGS. 12A and 12B, also in such a case, in order to optimize the end positions of the magnetic disks 12r having upward bowl shapes, the shim 15s having a thickness in accordance with the flatnesses of these magnetic disks 12r is inserted at the lower end of the ramp load mechanism 15. This causes the entire ramp load mechanism 15 including the plurality of ramps 151 to be raised upward, and can optimize the end positions of the magnetic disks 12r to the corresponding ramps 151.

Note that, as described above, when the magnetic disks 12r are assembled such that the deviations of the ends from the center point are in an upward direction, the ends of the magnetic disks 12r in a housing of the magnetic disk device in which a top cover and a base member are assembled deviate to the side of the top cover. Therefore, the directions of deviations at the ends of the magnetic disks 12r as described above may be called a top cover direction with the magnetic disk device as a reference. That is, in the magnetic disk device in FIGS. 12A and 12B, the ends of the magnetic disks 12c have predetermined amounts of deviations (displacements) of the magnetic disks 12c from the center point in the top cover direction.

Figure 13A:
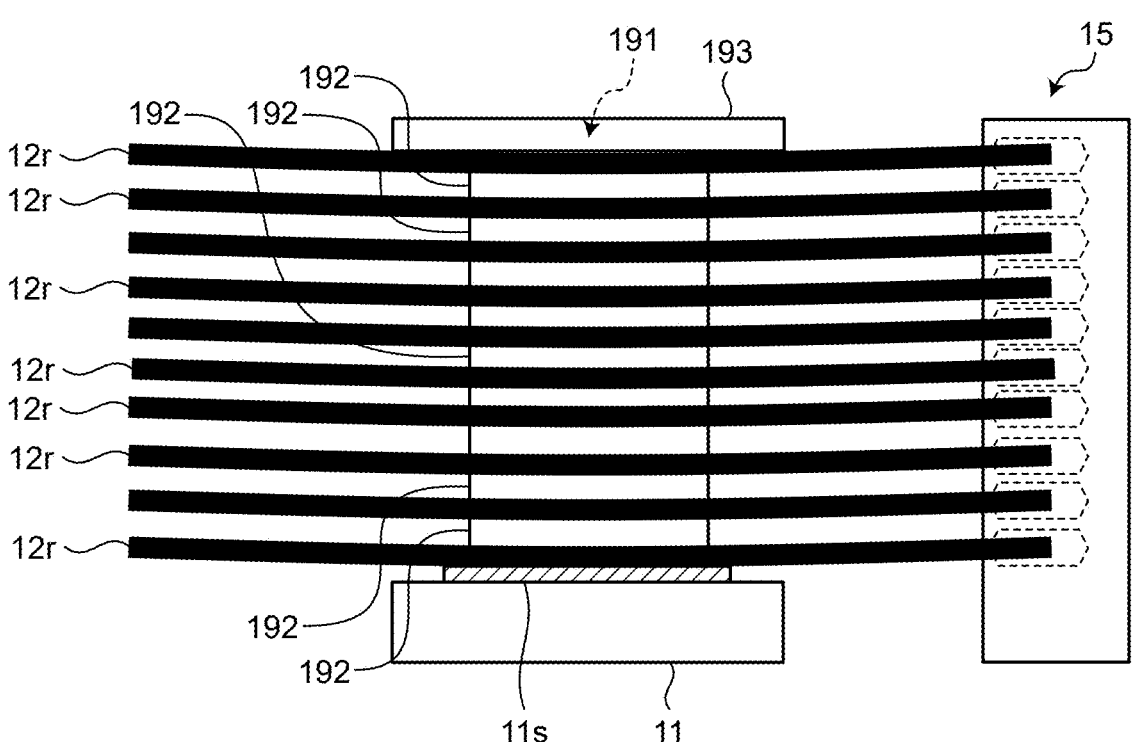
FIGS. 13A and 13B are schematic diagrams illustrating another example of a case where the magnetic disks having a flatness within a predetermined range are assembled in the magnetic disk device according to Variation 2 of the embodiment.
Figure 13B:
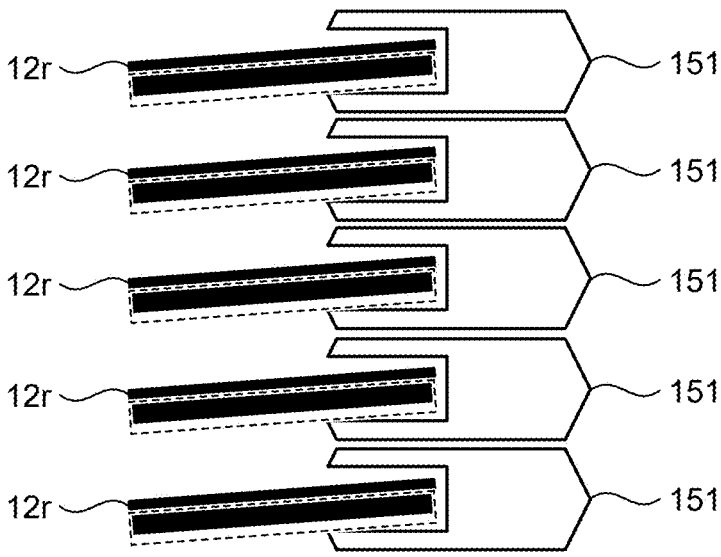

FIGS. 13A and 13B are schematic diagrams illustrating another example of a case where the magnetic disks 12r having a flatness within a predetermined range are assembled in the magnetic disk device according to Variation 2 of the embodiment. FIG. 13A illustrates a whole picture of the plurality of magnetic disks 12r assembled to the spindle 19. FIG. 13B illustrates an enlarged cross section of the ramp load mechanism 15 provided near the ends of the plurality of magnetic disks 12r.

In the example in FIGS. 13A and 13B, the initial relative heights of the spindle 19 and the plurality of ramps 151 are optimized for the magnetic disks 12 having the maximum amount of warpage which the magnetic disks 12 can have, for example. In this case, when the magnetic disks 12r having a warpage amount smaller than the maximum warpage amount are assembled so as to have upward bowl shapes, the ends of the magnetic disks 12r are arranged near the lower surfaces of the grooves of the corresponding ramps 151 at the initial relative heights of the spindle 19 and the plurality of ramps 151. Broken lines in FIG. 13B indicate such a state of the magnetic disks 12r.

As illustrated in FIGS. 13A and 13B, in order to optimize the end positions of the magnetic disks 12r arranged as described above, when the magnetic disks 12r having a warpage amount smaller than the maximum warpage amount are assembled, the shim 11s having a thickness in accordance with the flatnesses of these magnetic disks 12r is inserted at the lower end of the hub 191 of the spindle 19. This causes the entire spindle 19 to which the plurality of magnetic disks 12r is assembled to be raised upward, and can optimize the end positions of the magnetic disks 12r to the corresponding ramps 151.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a magnetic disk device including a spindle allowed to rotate in a state in which center axes of a plurality of magnetic disks having ends deviating from a geometrical plane with a center point as a reference are aligned, and a plurality of ramps being arranged at end positions of the plurality of magnetic disks, the method comprising:

selecting the plurality of magnetic disks such that amounts of deviations of the ends from the geometrical plane with the center point as a reference fall within a predetermined range;

preparing a plurality of shims having different thicknesses;

selecting and installing a shim having a predetermined thickness in accordance with the amounts of deviations among the plurality of shims so as to adjust relative heights of the spindle and the plurality of ramps; and assembling the plurality of magnetic disks along an axial direction of the spindle in a state in which directions of deviations of the ends from the center point are aligned.

2. The method of manufacturing a magnetic disk device according to claim 1, wherein:

the installing includes installing the shim near a lower end of the spindle; and the assembling includes assembling the plurality of magnetic disks to the spindle on which the shim has been installed in a state in which the directions of deviations of the ends are aligned such that the plurality of magnetic disks protrude upward.

3. The method of manufacturing a magnetic disk device according to claim 1, wherein:

the installing includes installing the shim near a lower end of a ramp load mechanism including the plurality of ramps; and the assembling includes assembling the plurality of magnetic disks to the spindle in a state in which the directions of deviations of the ends are aligned such that the plurality of magnetic disks protrude upward.

4. The method of manufacturing a magnetic disk device according to claim 1, wherein:

the installing includes installing the shim near a lower end of a ramp load mechanism including the plurality of ramps; and the assembling includes assembling the plurality of magnetic disks to the spindle in a state in which the directions of deviations of the ends are aligned such that the plurality of magnetic disks protrude downward.

5. The method of manufacturing a magnetic disk device according to claim 1, wherein:

the installing includes installing the shim near a lower end of the spindle; and the assembling includes assembling the plurality of magnetic disks to the spindle on which the shim has been installed in a state in which the directions of deviations of the ends are aligned such that the plurality of magnetic disks protrude downward.

6. The method of manufacturing a magnetic disk device according to claim 1, wherein:

the selecting the plurality of magnetic disks includes:

selecting, among the plurality of magnetic disks, a first magnetic disk group in which first amounts of deviations of the ends from the geometrical plane with the center point as a reference fall within the predetermined range;

selecting, among the plurality of magnetic disks, a second magnetic disk group in which second amounts of deviations are larger than the first amounts of deviations; and selecting, among the plurality of magnetic disks, a third magnetic disk group in which third amounts of deviations are smaller than the first amounts of deviations, wherein the preparing includes preparing the plurality of shims that enable adjustments of the relative heights of the spindle and the plurality of ramps for the first to third magnetic disk groups.

7. The method of manufacturing a magnetic disk device according to claim 1, wherein:

the selecting the plurality of magnetic disks includes:

selecting, among the plurality of magnetic disks, a first magnetic disk group in which first amounts of deviations of the ends from the geometrical plane with the center point as a reference fall within the predetermined range; and selecting, among the plurality of magnetic disks, a second magnetic disk group in which second amounts of deviations are larger than the first amounts of deviations; wherein the installing includes installing the shim having the predetermined thickness in accordance with the amounts of deviations of the first magnetic disk group near a lower end of a ramp load mechanism including the plurality of ramps; and the assembling includes assembling the first magnetic disk group to the spindle in a state in which the directions of deviations of the ends are aligned such that the first magnetic disk group protrudes upward.

8. The method of manufacturing a magnetic disk device according to claim 1, further comprising:

selecting, among the plurality of magnetic disks, a first magnetic disk group in which amounts of deviations of the ends from the geometrical plane with the center point as a reference fall within a predetermined range; and selecting, among the plurality of magnetic disks, a second magnetic disk group in which the amounts of deviations are larger than the amounts of deviations of the first magnetic disk group, wherein the installing includes installing the shim having the predetermined thickness in accordance with the amounts of deviations of the second magnetic disk group near a lower end of the spindle; and the assembling includes assembling the second magnetic disk group to the spindle in a state in which the directions of deviations of the ends are aligned such that the second magnetic disk group protrudes upward.

9. The method of manufacturing a magnetic disk device according to claim 1, further comprising:

selecting, among the plurality of magnetic disks, a first magnetic disk group in which amounts of deviations of the ends from the geometrical plane with the center point as a reference fall within a predetermined range; and selecting, among the plurality of magnetic disks, a second magnetic disk group in which the amounts of deviations are larger than the amounts of deviations of the first magnetic disk group, wherein the installing includes installing the shim having the predetermined thickness in accordance with the amounts of deviations of the first magnetic disk group near a lower end of the spindle; and the assembling includes assembling the first magnetic disk group to the spindle in a state in which the directions of deviations of the ends are aligned such that the first magnetic disk group protrudes downward.

10. The method of manufacturing a magnetic disk device according to claim 1, further comprising:

selecting, among the plurality of magnetic disks, a first magnetic disk group in which amounts of deviations of the ends from the geometrical plane with the center point as a reference fall within a predetermined range; and selecting, among the plurality of magnetic disks, a second magnetic disk group in which amounts of deviations are larger than the amounts of deviations of the first magnetic disk group, wherein the installing includes installing the shim having the predetermined thickness in accordance with the amounts of deviations of the second magnetic disk group near a lower end of a ramp load mechanism including the plurality of ramps; and the assembling includes assembling the second magnetic disk group to the spindle in a state in which the directions of deviations of the ends are aligned such that the second magnetic disk group protrudes downward.

* * * * *